United States Patent
Ma et al.

(10) Patent No.: US 7,297,454 B2
(45) Date of Patent: Nov. 20, 2007

(54) COLORLESS INKJET INK COMPOSITIONS FOR IMPROVED IMAGE QUALITY

(75) Inventors: Zeying Ma, San Diego, CA (US); John M Gardner, San Diego, CA (US); Gregg A Lane, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 143 days.

(21) Appl. No.: 10/208,994

(22) Filed: Jul. 30, 2002

(65) Prior Publication Data

US 2004/0030001 A1 Feb. 12, 2004

(51) Int. Cl.
*G03G 17/04* (2006.01)
*G03G 15/20* (2006.01)
*C09D 11/02* (2006.01)

(52) U.S. Cl. .................. 430/33; 523/160; 523/161; 106/31.14; 347/98; 347/100; 347/203

(58) Field of Classification Search ........... 523/160, 523/161; 106/31.14, 31.6; 347/98, 100; 430/33
See application file for complete search history.

(56) References Cited

U.S. PATENT DOCUMENTS

| | | | |
|---|---|---|---|
| 5,614,008 A | 3/1997 | Escano et al. | |
| 5,621,449 A | 4/1997 | Leenders et al. | |
| 5,640,187 A * | 6/1997 | Kashiwazaki et al. | 347/101 |
| 5,846,306 A * | 12/1998 | Kubota et al. | 106/31.75 |
| 5,886,067 A | 3/1999 | Li et al. | |
| 5,919,839 A | 7/1999 | Titterington et al. | |
| 5,922,114 A | 7/1999 | Sawada | |
| 5,939,468 A * | 8/1999 | Siddiqui | 523/161 |
| 5,954,865 A | 9/1999 | Sawada | |
| 6,048,925 A | 4/2000 | Titterington et al. | |
| 6,136,396 A | 10/2000 | Gilmer | |
| 6,149,719 A | 11/2000 | Houle | |
| 6,153,001 A * | 11/2000 | Suzuki et al. | 106/31.65 |
| 6,200,370 B1 | 3/2001 | Fujiwara et al. | |
| 6,245,135 B1 | 6/2001 | Jaeger et al. | |
| 6,309,453 B1 | 10/2001 | Banning et al. | |
| 6,383,276 B1 | 5/2002 | Yamakawa et al. | |
| 6,428,143 B2 * | 8/2002 | Irihara et al. | 347/43 |
| 6,439,708 B1 * | 8/2002 | Kato et al. | 347/98 |
| 6,444,020 B1 | 9/2002 | Seto et al. | |
| 6,455,679 B1 | 9/2002 | Tateishi et al. | |
| 6,464,766 B1 | 10/2002 | Banning et al. | |
| 6,471,758 B1 | 10/2002 | Kelderman et al. | |
| 6,475,271 B2 | 11/2002 | Lin | |
| 6,489,452 B1 | 12/2002 | Tateishi et al. | |
| 2001/0020964 A1 * | 9/2001 | Irihara et al. | 347/43 |
| 2003/0085974 A1 * | 5/2003 | Shimomura et al. | 347/101 |
| 2003/0193553 A1 * | 10/2003 | Issler | 347/100 |
| 2004/0032473 A1 * | 2/2004 | Ishimoto et al. | 347/100 |
| 2004/0092621 A1 * | 5/2004 | Kataoka et al. | 523/160 |

FOREIGN PATENT DOCUMENTS

| | | |
|---|---|---|
| EP | 709221 A1 * | 5/1996 |
| EP | 1118468 A2 * | 7/2001 |
| EP | 1145865 A2 * | 10/2001 |
| EP | 1148104 * | 10/2001 |
| JP | 08085218 A * | 4/1996 |
| JP | 2002201434 | 7/2002 |
| JP | 2002211106 | 7/2002 |

OTHER PUBLICATIONS

Machine Translation of 08-085218 A (1996).*
EP Search report dated Sep. 1, 2003.

* cited by examiner

*Primary Examiner*—Tae H Yoon

(57) ABSTRACT

A colorless ink jet ink composition is provided for printers for printing on both porous and hybrid glossy or semi-glossy media. The ink composition comprises a water soluble polymer or dispersed latex. The ink formulation provides substantially air fast, stain resistant, and light fastness to the printed image. Further, the ink formulation evidences improved overall image quality.

12 Claims, 2 Drawing Sheets

COLORLESS INKJET INK COMPOSITIONS FOR IMPROVED IMAGE QUALITY

TECHNICAL FIELD

The present invention is directed generally to non-impact inkjet printers, such as piezo and thermal, and, more particularly, to colorless ink jet ink compositions for such printers.

BACKGROUND ART

Along with the computerization of offices in the 1980's came electronically controlled non-impact printers such as the ink jet and laser printers. Drop-on-demand inkjet printers can be piezo or thermal (bubble jet). In piezo ink jet systems, ink drop-lets are ejected by an oscillating piezo crystal. However, the thermal ink jet dominates the drop-on-demand photo ink jet market. In this system, rapid heating behind the ink nozzles cause a bubble of vapor to form in the ink. The resulting bubble expansion and ink ejection from the inkjet printer cartridge causes printing to appear on the substrate.

Full-color inkjet printers are more common than color lasers and are much more economical. The main advantage of inkjet printers over lasers and other non-impact printing techniques include their low cost and simplicity. Thermal inkjet systems are capable of dispensing ink rapidly and accurately. The technology of this and other inkjet systems are discussed in the *Chemistry and Technology of Printing and Imaging Systems*, edited by P. Gregory, published by Chapman & Hall, 1996. Representative thermal inkjet systems and cartridges are discussed in U.S. Pat. No. 4,500,895 to Buck et al., U.S. Pat. No. 4,513,298 to Scheu, and U.S. Pat. No. 4,794,409 to Cowger et al., which are all hereby incorporated by reference.

The technology of inkjet printers has undergone many changes and improvements since they first appeared. Research has been conducted to ensure that the images produced are of consistent high quality. Thus, it is important that the images be permanent by being lightfast, airfast, and stain resistant, and the like when exposed to the atmosphere, light, and daily use by typical consumers. Another important feature is print quality. The image must appear uniform in gloss, especially for photographic printing.

As used herein, air fastness will mean that the images do not fade when exposed to the atmosphere. Air fastness is a measure of permanence as used herein. Air fastness is measured by exposing printed images to gas in a chamber and comparing print density before and after the exposure.

Another desired feature of printed images is light fastness. As used herein, light fastness will mean that the images do not fade when exposed to light. Light fastness is another measure of permanence as used herein. Light fastness is measured by exposing printed images to intense light in light chambers (fadometers) and comparing print density before and after the exposure.

Dye based inkjet ink produces super image quality, or photo quality, with gloss media type substrates. However, the images can not last very long due to light and gas fade. Currently, there are two commonly used ways of addressing this problem: 1) laminate the printer image with a coating; or 2) use pigmented ink instead of dye based inks. The first approach is costly and adds complexity to the printing process. The second approach faces the challenge of matching the photo and image quality of the dye based ink. To help solve the problem associated with pigmented inks, many in the industry use porous semi-gloss media that allows fast dry and good spreading of the pigmented ink. As a result, the inked area has high gloss from the pigment ink formula and good image quality, but the areas without print, or white areas, have loss gloss. This produces an objectionable non-uniform glossy surface when viewed.

As stated above pigmented inks for photographic printing requires, among other things, fast-drying glossy media. By "photographic printing" is typically meant graphic art and photographic prints, typically from digital. Examples of such printers include Hewlett-Packard's DesignJet series (2000, 2500CP, 2800, 3500CP, 3800, 5000, 5000PS); an example of a glossy media printer includes Hewlett-Packard's Photosmart Printer. The afore-mentioned printers print on porous, glossy media, among others.

Thus, an ink composition is required that eliminates, or at least minimizes, the foregoing problems, while providing improved image quality print on porous, or hybrid porous glossy or semi-glossy media, consistent with silver halide photography.

Moreover, this invention provides durability and stain resistance to photos printed with pigmented inks such that lamination is not needed.

DISCLOSURE OF INVENTION

In accordance with the present invention, a colorless ink jet ink composition is provided for use with pigmented inks printed on porous, semi-porous, and hybrid glossy or semi-glossy media. The colorless ink composition comprises a soluble polymer or dispersed latex (collectively referred to herein as "polymer") as well as an ink vehicle. Preferred soluble polymers include acrylics and styreneacrylics. Without being limited by theory, it is believed that the polymer in the colorless ink acts similarly to pigments and clogs the pores of the porous or semi-porous media to increase the gloss and make it more uniform over the entire surface of the media. In contrast to known colorless fluids used for inkjet printing, especially in $5^{th}$ pen formulations, this invention does not overprint or underprint the colorless fluid with the color inks but uses the colorless ink to fill in the spaces wherein there is an absence of color to promote a uniform surface. So-called $5^{th}$ pen, or fixer, formulations are mainly concerned with interactions between the colorless fluid and the color inks for bleed control or stability. This invention is designed to provide a uniform glossy appearance and stain resistance to photos. By "$5^{th}$ pen" is meant additional pens over the basic inkset of C, Y, M, and K. There may be additional pens containing gray and other colors as well.

The total polymer or latex concentration ranges from about 0.5 to about 15, preferably from about 2 to about 7, wt % of the colorless ink composition. The colorless ink is substantially free of colorants visible to the unaided eye. By "substantially free" is meant that colors are not present such that the unaided eye cannot detect a color. This means typically from 0 to less than about 0.01% colorant is present. Dyes or pigments free of colorants and typically invisible to the unaided eye includes IR or UV dyes and may be included herein.

A printer, such as the DesignJet 5000PS that accommodates the hybrid glossy media will provide the customer with substantially fast ink drying while maintaining the light fastness, air fastness, and stain resistance of the ink, compared to prior art inks.

The ink of the present invention improves overall image quality. The ink can also pass harsh pen material compatibility tests. The ink does not puddle on the surface of the orifice plate in the default pen, yet has low viscosity. The ink is excellent in pen reliability such as long decap time, no decel, no kogation, and good drop directionality.

The term "decap time" refers to the time required for ink to crust in the nozzles of the pen; a long decap time is desired. By "decel" is meant that the velocity of ink drops decreases with time during continuous firing of the pen, and is an undesirable property. However, some decel is acceptable in colorless inks because they are invisible.

BEST MODES FOR CARRYING OUT THE INVENTION

Figure 1:
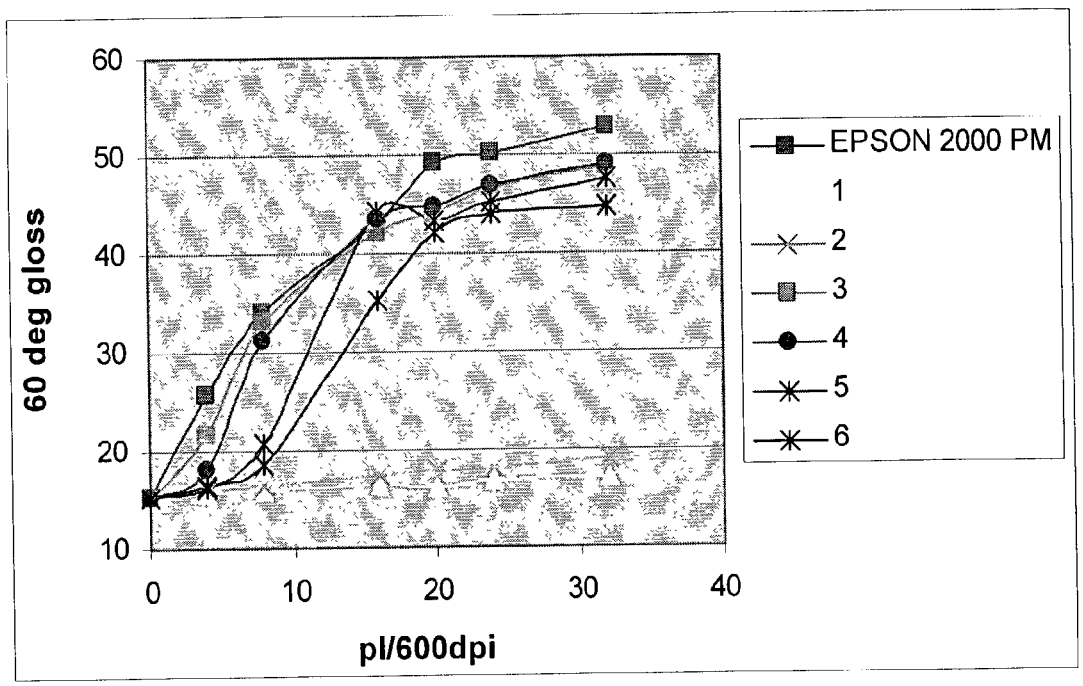
FIG. 1 reflects the gloss value of ink versus the acrylic polymer concentration.

The invention described herein is directed to improved inks for printing ink-jet images using commercially-available ink-jet printers, such as those manufactured by Hewlett-Packard Company, Palo Alto, Calif. The colorless inks of the present invention can produce a clear, glossy surface on the media, whether porous, semi-porous, or hybrid, with high air fastness, stain resistance, and light fastness. Any known ink formlation, with the removal of the colorant and the presence of the polymers described herein, can work as the colorless ink useful herein. Those skilled in the art will be able to select and optimize the ingredients that work with the polymers of this invention and provide the colorless inks.

The colored inks of the present invention include yellow, cyan, magenta, black inks containing a yellow pigment, a cyan pigment, a magenta pigment, and black pigment respectively.

The amount of pigment used is within the range from about 0.5 to about 20 weight percent. A more preferable range of pigment ranges from about 1 to about 15% by weight, still more preferably is a range of from about 2% to about 12% by wt.

Examples of pigments used for a yellow ink include C.I. Pigment Yellow 1, C.I. Pigment Yellow 2, C.I. Pigment Yellow 3, C.I. Pigment Yellow 13, C.I. Pigment Yellow 16, C.I. Pigment Yellow 83, Pigment Yellow 74, Pigment Yellow 138 Pigment Yellow 158, Pigment Yellow 128, Pigment Yellow 151, and the like. Examples of pigments used for magenta ink include C.I. Pigment Red 5, C.I. Pigment Red 7, C.I. Pigment Red 12, C.I. Pigment Red 48 (ca), C.I. Pigment Red 48 (mn), C.I. Pigment Red 57 (Ca), C.I. Pigment Red 112, C.I. Pigment Red 122, and the like. Examples of pigments used for a cyan include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, C.I. Vat Blue 6, and the like. Pigments whose performance properties are satisfactory when formulated for the present invention are considered to be within its scope.

The colored ink formulations to use for the print image in conjunction with the colorless inks of the present invention comprises a colorant plus a vehicle. A typical vehicle formulation for an ink useful in the practice of this invention includes the colorant, present in about 0.5 to about 20 weight percent, one or more co-solvents, present from 0 to 50 weight percent, one or more water-soluble surfactants, present in about 0.1 to 4 weight percent. The balance of the formulation is purified water. The colorless ink is similar except for the absence of a colorant and the presence of a soluble polymer or latex.

One or more co-solvents may be added to the formulation of the ink of this invention. Classes of co-solvents include, but are not limited to, aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like.

One class of preferred co-solvents that provides water miscibility to polymers is glycols. A particularly preferred glycol is polyethylene glycol, commonly abbreviated as PEG. Polyethylene glycol is hydrophilic.

Water-soluble surfactants may be employed in the formulation of the vehicle of the ink of this invention. The purpose of surfactants as described herein is to facilitate the miscibility of the ingredients of the ink composition. The surfactant(s) used are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substitued amine oxides, and the like. The amount of surfactant added to the formulation of this invention may range from less than one to about 10 weight percent. A more preferred amount is from 1 to about 3 weight percent.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), and Proxel (ICI America).

Sequestering agents such as EDTA (ethylene diamine tetra acetic acid) may be included to eliminate the deleterious effects of heavy metal impurities, and buffer solutions may be used to control the pH of the ink. Viscosity modifiers may also be present, as well as other additives known to those skilled in the art to modify properties of the ink as desired.

All concentrations herein are in weight percent of the total ink composition, unless otherwise indicated. The purity of all components is that employed in normal commercial practice for ink-jet inks.

The black ink suitably employed in the practice of the present invention is also pigment-based. The black ink can also be a composite of the three primary colors, yellow, cyan, and magenta. Suitable black pigment-based inks are disclosed and claimed, for example, in U.S. Pat. No. 5,085,698, entitled "Aqueous Pigmented Inks for Ink Jet Printers"; U.S. Pat. No. 5,221,334, entitled "Aqueous Pigmented Inks for Ink Jet Printers"; and U.S. Pat. No. 5,302,197, entitled "Ink Jet Inks", all assigned to E.I. Du Pont de Nemours and Company. Other manufacturer of black pigments include Cabot, Orient, BASF, and Clariant.

An example of a pigment used for black ink is carbon black. The carbon black may be produced by either a furnace or channel method. The primary particle size of this material ranges from 15 to 40 μm, specific surface area is 50 to 300 m2/g, and has oil absorption from 40 to 150 ml/100 g, the volatile component is 0.5 to 10%, and the pH value may range from 2 to 9. Examples of suitable commercially available carbon blacks include No. 2300, No. 900, MCF88, No. 33, No. 40, No. 45, No. 52, MA&, MA8, No. 2200B, Raven 1255, Regal 400R, Regal 330R, Regal 660 R, Mogul L, Color Black FW1, Color Black FW18, Color Black S170, Color Black S150, Printex 35, and Printex U.

Hostafine Black TS contains hydrophilic ultrafine pigment dispersions based on non-ionic dispersing and wetting agents. It contains carbon black and has a pigment concentration of 33%.

Other black colorants, which may be used, include those listed in the Color Index and in Textile Chemist and Colorist reference publications. Water-soluble black colorants are commercially available from colorant vendors such as Cabot Corporation, Orient Chemical, and other manufacturers. Surface modified colorants from these manufacturers are initially water insoluble colorants which, by certain modifications, are solubilized or stabilized as fine dispersions in water to prevent agglomeration. See U.S. Pat. Nos. 5,707,432; 5,630,868; 5,571,311; and 5,554,739 for a discussion of modified carbon black pigments and methods of attaching functionalized groups to aid in their solubility.

EXAMPLES

Example 1

Examples of colorless ink-jet ink compositions in accordance with the present invention are listed in Table I below.

brings the image good gloss uniformity. A colorless vehicle lacking in polymer (Ink examples 1-1 and 1-2) results in the same gloss level as the media.

Example 2

Instead of using water-soluble polymer, latex polymers can be used for the colorless ink. Table 2 listed another example of colorless ink (or clear ink) as well as the formulas of CMY inks.

TABLE 2a

| Ink ID | Ink formulations, wt % | | | |
|---|---|---|---|---|
| | C | M | Y | Clear Ink |
| LEG-1 | 3 | 3 | 3 | 3 |
| 2-pyrrolidone | 6 | 6 | 6 | 5 |
| Glycerol | 5 | 5 | 5 | 4 |
| 1,2-Hexanediol | 4 | 4 | 4 | 4 |
| Surfynol 61 | 0.72 | 0.72 | 0.72 | 0.75 |
| NPA | 0.75 | 0.75 | 0.75 | 0.75 |
| Zonyl FSO | 0.2 | 0.2 | 0.2 | 0.2 |
| Biocide | 0.2 | 0.2 | 0.2 | 0.1 |
| Cyan pigment | 1.56 | | | |
| Magenta pigment | | 2.90 | | |
| Yellow pigment | | | 1.55 | |
| Joncryl 586 (Jonson Polymers) | 1.3 | 1.3 | 1.3 | |
| Latex #1 | | | | 4.3 |
| Latex #2 | | | | 1.6 |
| DDI water | Balance | Balance | Balance | balance |
| Total: | 100 | 100 | 100 | 100 |

PH = 9.1 to 9.4 w/KOH for final ink

Descriptions for Latex #1 and 2 are found in patent application Ser. No. 09/956431. Other commercially available latex may also be used, and examples include Joncryl 142,

TABLE I

| | Ink Formulation. | | | | | |
|---|---|---|---|---|---|---|
| Component | 1 | 2 | 3 | 4 | 5 | 6 |
| EDTA, Na salt | 0.1 wt % | 0.1 wt % | 0.1 wt % | 0.1 wt % | 0.1 wt % | 0.1 wt % |
| Biocide | 0.15 wt % | 0.15 wt % | 0.15 wt % | 0.15 wt % | 0.15 wt % | 0.15 wt % |
| Surfactant | 0.8 wt % | 0.8 wt % | 0.8 wt % | 0.8 wt % | 0.8 wt % | 0.8 wt % |
| Surfactant DOWFAX | 0.32 wt % | 0.32 wt % | 0.32 wt % | 0.32 wt % | 0.32 wt % | 0.32 wt % |
| SURFYNOL | 0.16 wt % | 0.16 wt % | 0.16 wt % | 0.16 wt % | 0.16 wt % | 0.16 wt % |
| 1,6-hexanediol | 9 wt % | 9 wt % | 9 wt % | 9 wt % | 9 wt % | 9 wt % |
| 2-pyrrolidone | 4 wt % | 4 wt % | 4 wt % | 4 wt % | 4 wt % | 4 wt % |
| MOPS | 0.05 wt % | 0.05 wt % | 0.05 wt % | 0.05 wt % | 0.05 wt % | 0.05 wt % |
| PG/EG | | 8 wt % | | | | 8 wt % |
| Joncryl 60, 34.41% | | | 20 wt % | 15 wt % | 10% wt % | 12 wt % |
| Polymer in ink by wt % | 0 | 0 | 6.9 | 5.2 | 3.4 | 4.1 |
| DDI Water | Balance | Balance | Balance | Balance | Balance | Balance |
| Total | 100 wt % | 100 wt % | 100 wt % | 100 wt % | 100 wt % | 100 wt % |

Notes:
EDTA is ethylene diamine tetraacetate.
DDI water is distilled deionized water.
pH adjusted with KOH for the vehicle to 7.2 to 7.3.
pH adjusted with KOH or HNO$_3$ for final ink to 7.5 to 7.6.
PG/EG is a mixture of propylene glycol and ethylene glycol
MOPS is 4-morpholinepropanesulfonic acid.
Gloss results with EPSON Semi-glossy Media ®(Premium Luster Photo Paper ®, S041405) are given in figure 1.
Gloss is measured on a glossmeter: BYK Gardner Micro-Tri-Gloss Meter.

As illustrated in FIG. 1, the gloss value is matched with the ink (EPSON magenta) when the acrylic polymer concentration above about 4 wt %. The high gloss value at imaged area delivers the distinctiveness of image. The overlay of gloss curves of the colorless ink to the colored ink Joncryl 624, Joncryl 585, Joncryl 617, Joncryl 77, Joncryl 74, Joncryl 60 (all from Johnson Polymers), or Rhoplex latex emulsions from Rohm and Haas. Water-soluble resins are acrylic or styreneacrylic copolymers (Preferably MW is from 1,600 to 25,000 and acid value is from 100 to 250), such as Joncryl 586, Joncryl 683, Joncryl 555, Joncryl 671, Joncryl 550, Joncryl 682, Joncryl 679, Joncryl 68.

Figure 2:
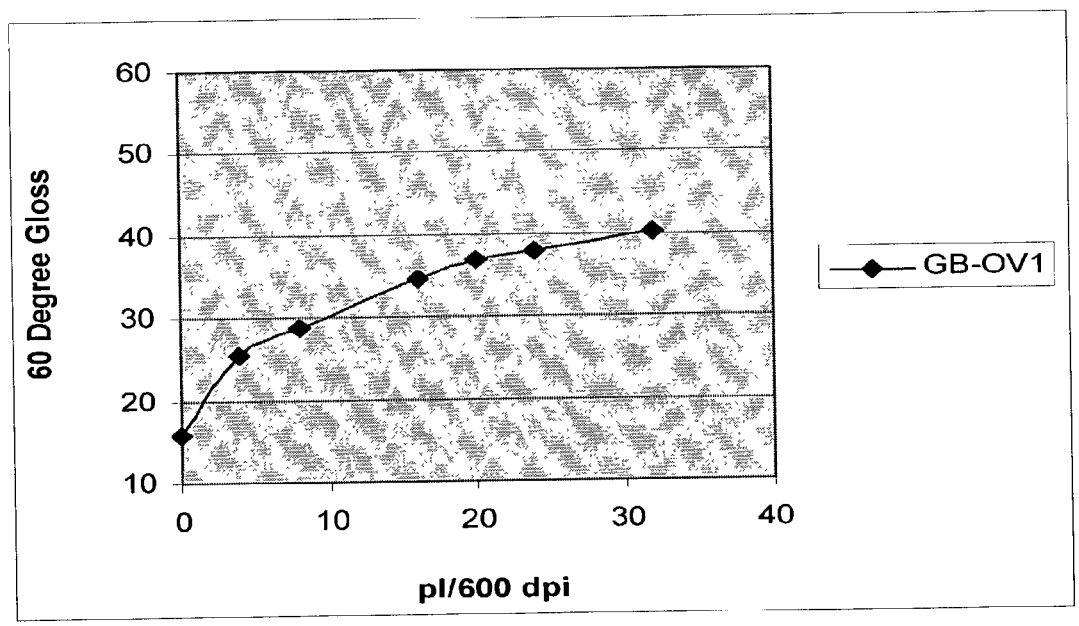
FIG. 2 shows gloss on Epson Luster media as ink laydown increases.
Figure 3:
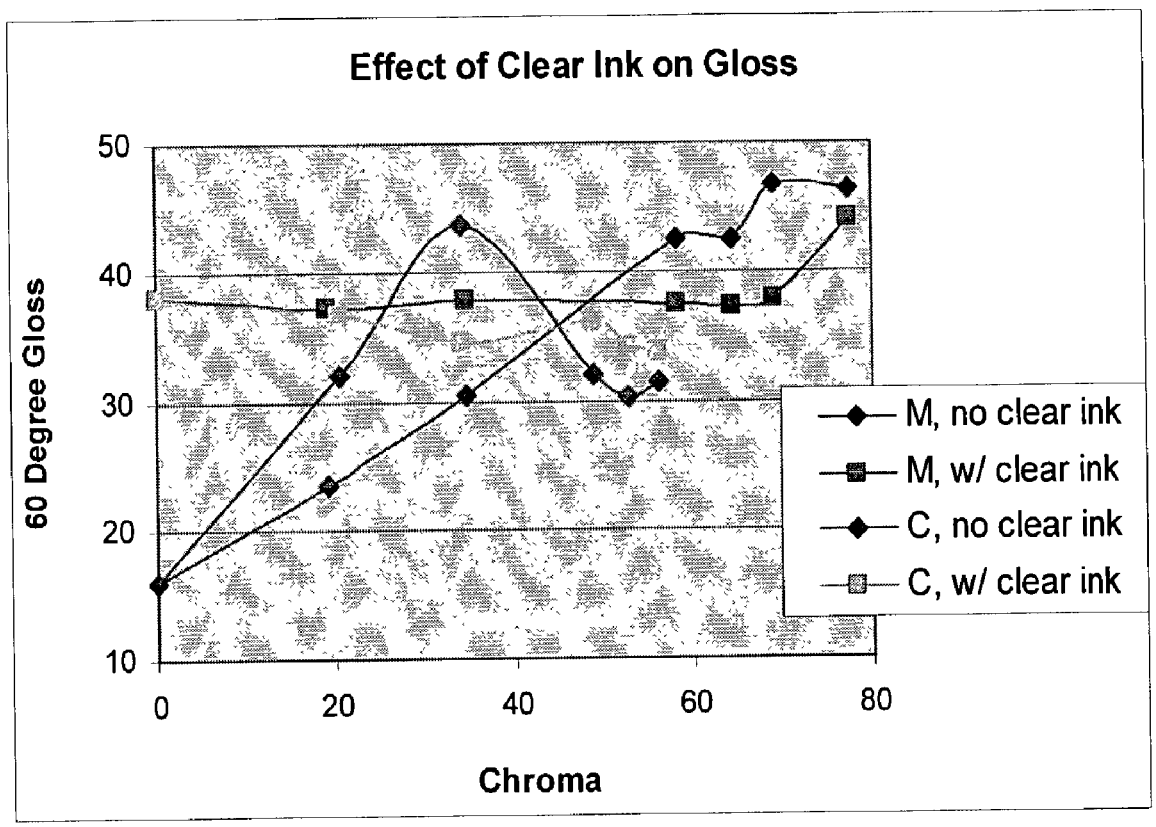
FIG. 3 illustrates the gloss of magenta and cyan area fills with and without the clear ink.

Similar to Example 1, this ink also improved gloss on Epson Luster media as ink lay-down increased (FIG. 2). FIG. 3 illustrates the gloss of magenta and cyan area fills with and without the clear ink.

Gloss uniformity was achieved across entire color tone range through the addition of clear ink mainly onto the white and low color density areas. Total ink flux per unit area was maintained constant. Table 2b and 2c explain the printing mechanism. As indicated by the standard deviation, gloss uniformity was improved to excellence with the use of clear ink.

TABLE 2a

60 Degree gloss and standard deviation in the absence of clear ink

| Ink flux, pl/600dpi | 0 | 4 | 8 | 16 | 20 | 24 | 32 |
|---|---|---|---|---|---|---|---|
| Magenta | 15.9 | 23.5 | 30.4 | 42.4 | 42.4 | 46.8 | 46.3 |
| Cyan | 15.9 | 32.0 | 43.7 | 32.0 | 30.3 | 31.4 | 29.6 |
| Yellow | 15.3 | 28.1 | 44.4 | 47.0 | 43.3 | 41.2 | 34.3 |
| Ink flux, pl/600dpi | 0 | 8 | 16 | 24 | 28 | 32 | 40 |
| Red | 16.0 | 37.9 | 41.8 | 39.8 | 38.6 | 37.1 | 39.9 |
| Green | 15.3 | 41.4 | 35.7 | 30.5 | 32.6 | 32.4 | 32.5 |
| Blue | 16.0 | 34.6 | 35.5 | 37.2 | 37.6 | 36.4 | 38.0 |

STDEV on gloss with all patches 9.20

TABLE 2b

60 Degree gloss and standard deviation in the presence of clear ink

| Color ink flux, pl/600dpi | 0 | 4 | 8 | 16 | 20 | 24 | 32 |
|---|---|---|---|---|---|---|---|
| Clear ink flux, pl/600dpi | 32 | 28 | 24 | 16 | 12 | 8 | 0 |
| Magenta | 38.0 | 37.2 | 37.9 | 37.5 | 37.2 | 37.9 | 44.0 |
| Cyan | 38.0 | 36.6 | 34.6 | 36.0 | 34.1 | 33.7 | 29.9 |
| Yellow | 37.3 | 38.1 | 37.5 | 36.1 | 38.6 | 41.1 | 34.3 |
| Color ink flux, pl/600dpi | 0 | 8 | 16 | 24 | 28 | 32 | 40 |
| Clear ink flux, pl/600dpi | 32 | 32 | 24 | 16 | 12 | 8 | 0 |
| Red | 36.8 | 38.5 | 38.3 | 36.7 | 37.9 | 38.0 | 41.3 |
| Green | 40.2 | 37.8 | 35.5 | 34.2 | 34.9 | 33.8 | 33.0 |
| Blue | 36.0 | 38.2 | 35.1 | 34.0 | 35.8 | 35.9 | 41.6 |

STDEV on gloss with all patches 2.58

Example 3

TABLE 3a

Red Marker Stain Score for Print Area

| Media Type | High Density Yellow | Low Density Yellow | Low Density Yellow Plus Clear | Clear Ink from Example 2 | Unprinted Media |
|---|---|---|---|---|---|
| Epson Luster | 3 | 1 | 4 | 5 | 1 |
| Pearl Semi-gloss | 4 | 1 | 5 | 4 | 1 |
| Canon Photo | 4 | 1 | 4 | N/A | 1 |

TABLE 3b

Mixed Berry Juice Stain Score for Print Area

| Media Type | High Density Yellow | Low Density Yellow | Low Density Yellow Plus Clear | Clear Ink from Ex. 2 | Unprinted Media |
|---|---|---|---|---|---|
| Epson Luster | 5 | 1 | 5 | 5 | 1 |
| Pearl Semi-gloss | 5 | 1 | 5 | 5 | 1 |
| Canon Photo | 4 | 1 | 4 | N/A | 1 |

Procedure for the Stain Test: Table 3a shows the scores for testing the stain resistance on various media using color ink and the unprinted media by Vis-a-vis wet-erase marker applied to an area and then wiped with a wet cloth within 10-30 seconds. Table 3b shows the scores for testing the stain resistance on various media using color ink plus the colorless ink of this invention with Seneca Mixed Berry Juice applied to an area and allowed to stand for one minute. The juice was removed with a dry cloth. Both stains were ranked with the following 5-point scale
5 Little to no stain
4 Slight stain
3 Moderate stain
2 Moderately heavy stain
1 Heavy stain Test Conclusions: Addition of clear ink to unprinted media or low density ink areas made stain resistance equal to or better than high density print areas. This makes the stain resistance of a print more uniform over density.

INDUSTRIAL APPLICABILITY

The inks of the present invention are expected to find use in piezo and thermal ink-jet printers in combination with glossy print media.

What is claimed is:
1. A system for printing a uniformly glossy and stain resistant image, comprising:
glossy or semi-glossy coated paper;
an ink-jet inkset for printing images with spaces on the print media, said inkset comprising 1) a colorless ink-jet ink comprising a water soluble polymer or dispersed latex; wherein said colorless ink-jet ink is substantially free of colorants, and 2) one or more colored inks comprising a pigment colorant; and
ink-jet pens containing said inkset, said ink-jet pens including a $5^{th}$ pen, wherein said $5^{th}$ pen contains said colorless ink-jet ink and is configured to not overprint or underprint the one or more colored inks with the colorless ink-jet ink, but rather causes the colorless ink-jet ink to fill in the spaces wherein there is an absence of color, thereby providing the uniformly glossy and stain resistant image.

2. A system according to claim 1 wherein said pigment in said colored ink is selected from the group consisting of yellow pigment, cyan pigment, magenta pigment, black pigment, and mixtures thereof.

3. A system according to claim 2 wherein said pigment in said colored ink is present in an amount of from about 0.5% to about 20% by weight of ink composition.

4. A system according to claim 1 wherein said polymer or latex in said colorless ink-jet ink is present in an amount of from about 0.5% to about 15 wt % of the colorless ink composition.

5. A system according to claim 1 wherein said colorless ink-jet ink additionally comprising a colorless colorant selected from the group consisting of IR colorants, UV colorants, and mixtures thereof.

6. A system according to claim 1 wherein said colorless ink additionally comprises one or more co-solvents, present from 0% to about 50% by wt and one or more water-soluble surfactants, present from about 0.1% to about 4% by wt.

7. A system according to claim 1 wherein said colored ink additionally comprises one or more co-solvents, present from 0% to about 50% by wt and one or more water-soluble surfactants, present from about 0.1% to about 4% by wt.

8. A method of printing on glossy or semi-glossy coated paper a uniformly stain resistant and glossy image over an entire print surface of the image; said method comprising printing said image with an inkset comprising 1) a colorless ink containing a water soluble polymer or dispersed latex; wherein said colorless ink is substantially free of colorants, and 2) one or more colored inks comprising a pigment colorant; wherein said printing step includes applying the colorless ink with respect to the colored ink such that the colorless ink is i) printed to fill in spaces where there is an absence of color, and ii) not overprinted or underprinted with respect to the colored ink, thereby forming the uniformly stain resistant and glossy image.

9. A method according to claim 8 wherein said pigment in said colored ink is selected from the group consisting of yellow pigment, cyan pigment, magenta pigment, black pigment, and mixtures thereof.

10. A method according to claim 9 wherein said pigment in said colored ink is present in an amount of from about 0.5% to about 20% by weight of colored ink composition.

11. A method according to claim 9 wherein said polymer or latex in said colorless ink-jet ink is present in an amount of from about 0.5% to about 15 wt % of the colorless ink composition.

12. A method according to claim 9 wherein said colorless ink additionally comprises a colorless colorant selected from the group consisting of IR colorants, UV colorants, and mixtures thereof.

* * * * *